US012377656B2

(12) United States Patent
Karasawa

(10) Patent No.: US 12,377,656 B2
(45) Date of Patent: Aug. 5, 2025

(54) LIQUID STORAGE AND METHOD OF REUSING ADAPTER

(71) Applicant: SEIKO EPSON CORPORATION, Tokyo (JP)

(72) Inventor: Masahiro Karasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 173 days.

(21) Appl. No.: 18/241,569

(22) Filed: Sep. 1, 2023

(65) Prior Publication Data

US 2024/0075746 A1 Mar. 7, 2024

(30) Foreign Application Priority Data

Sep. 5, 2022 (JP) ................................ 2022-140544

(51) Int. Cl.
*B41J 2/175* (2006.01)

(52) U.S. Cl.
CPC ....... *B41J 2/17523* (2013.01); *B41J 2/17513* (2013.01); *B41J 2002/17516* (2013.01)

(58) Field of Classification Search
CPC .... B41J 2/175; B41J 2/17506; B41J 2/17509; B41J 2/17513; B41J 2/1752; B41J 2/17523; B41J 2/17553; B41J 2/1759
See application file for complete search history.

(56) References Cited

U.S. PATENT DOCUMENTS

| | | | | |
|---|---|---|---|---|
| 5,583,549 | A | 12/1996 | Ujita et al. | |
| 6,227,638 | B1 * | 5/2001 | Childers | B41J 2/17566 347/7 |
| 9,550,366 | B2 * | 1/2017 | Okazaki | B41J 2/17526 |
| 2003/0156154 | A1 * | 8/2003 | Yamaguchi | B41J 2/17523 347/86 |
| 2017/0087858 | A1 | 3/2017 | Hayashi | |

FOREIGN PATENT DOCUMENTS

| | | | |
|---|---|---|---|
| CN | 208827348 | U | 5/2019 |
| CN | 209176325 | U | 7/2019 |
| CN | 210757523 | U | 6/2020 |
| JP | 2018-153949 | A | 10/2018 |
| WO | 2019/026105 | A1 | 2/2019 |

* cited by examiner

*Primary Examiner* — Anh T Vo
(74) *Attorney, Agent, or Firm* — Oliff PLC

(57) ABSTRACT

A liquid storage includes: a liquid storing portion for storing liquid; a liquid supply member coupled to the liquid storing portion and having a supply path for supplying the liquid stored in the liquid storing portion to a printing apparatus; and an adapter having a plurality of engaging portions configured to engage the liquid supply member.

4 Claims, 10 Drawing Sheets

LIQUID STORAGE AND METHOD OF REUSING ADAPTER

The present application is based on, and claims priority from JP Application Serial Number 2022-140544, filed Sep. 5, 2022, the disclosure of which is hereby incorporated by reference herein in its entirety.

BACKGROUND

1. Technical Field

The present disclosure relates to a technology for a liquid storage and a method of reusing an adapter.

2. Related Art

A liquid storage including a bag-shaped member, a liquid supply port coupled to the bag-shaped member, and an adapter that fixes the liquid supply port inside is known. JP-A-2018-153949 is an example of the related art.

In the related art, the adapter is composed of two members: a first member and a second member. The first member and the second member are coupled with coupling members in a state of pinching the liquid supply port. In the related art, the liquid supply port is fixed by being pinched by the first member and the second member and is not directly engaged with the adapter. Hence, there is a possibility that the adapter detaches from the liquid supply port.

SUMMARY

A first aspect of the present disclosure provides a liquid storage configured to be detachably attached to a printing apparatus. The liquid storage includes: a liquid supply member coupled to the liquid storing portion and having a supply path for supplying the liquid stored in the liquid storing portion to the printing apparatus; and an adapter having a plurality of engaging portions configured to engage the liquid supply member.

A second aspect of the present disclosure provides a method of reusing an adapter configured to engage a liquid supply member of a liquid storage. The reuse method applies an external force to the plurality of engaging portions of the liquid storage of the above aspect by using a tool having protrusions adapted to the plurality of engaging portions to elastically deform and displace the snap-fit portions so as to release engagements of the engaging portions.

DESCRIPTION OF EMBODIMENTS

A. Embodiment

A1. Configuration of Liquid Ejecting Apparatus

Figure 1:
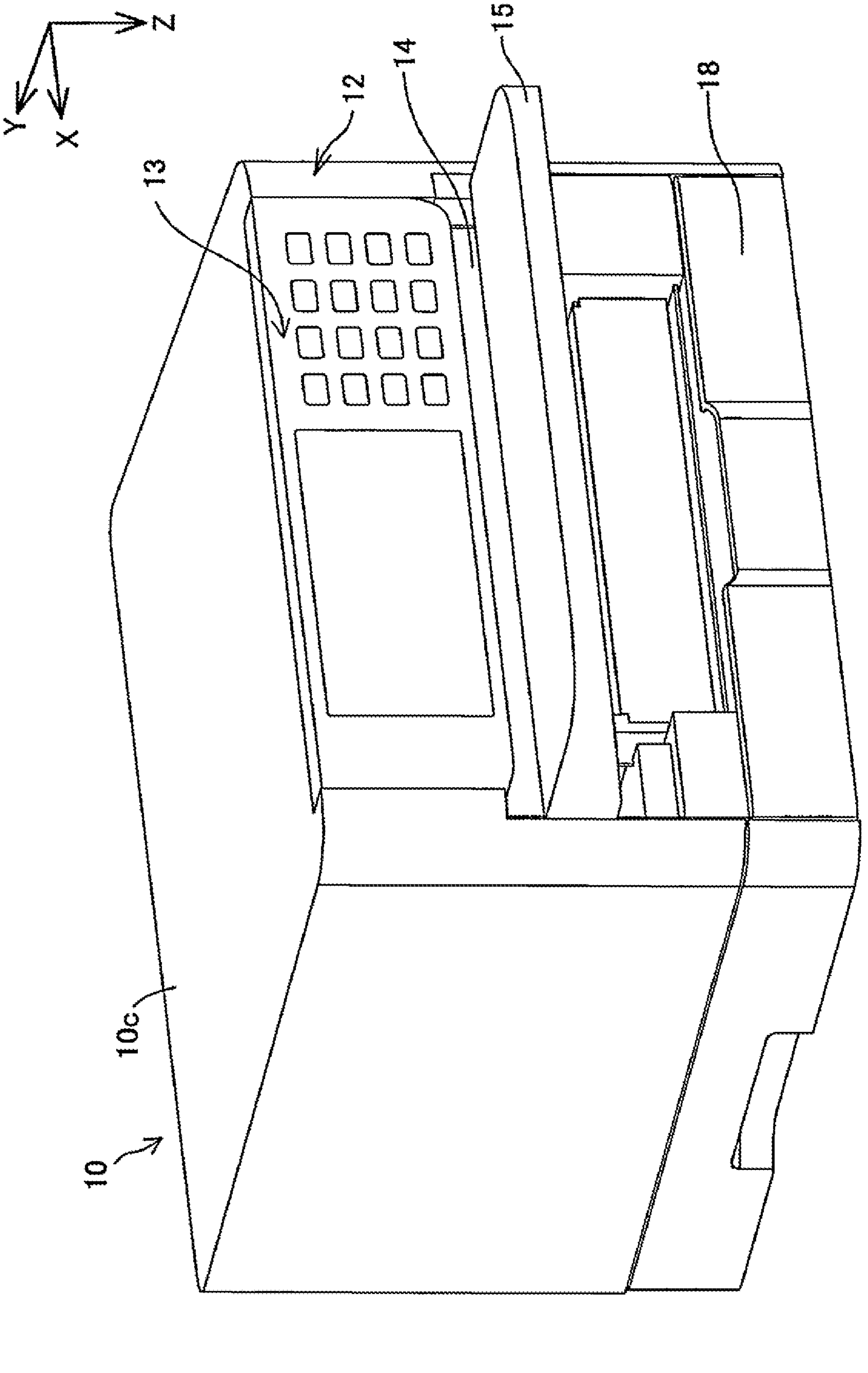
FIG. 1 is a perspective view of a printing apparatus of the present embodiment.

FIG. 1 is a perspective view of a printing apparatus 10 according to the present embodiment. FIG. 1 illustrates arrows X, Y, and Z indicating three directions orthogonal to one another. The arrows X, Y, and Z are illustrated in other figures as necessary so as to indicate the same directions as in FIG. 1.

The directions indicated by the arrows X, Y, and Z are based on the orientation of the printing apparatus 10 in normal use. Normal use of the printing apparatus 10 refers to a state in which the printing apparatus 10 is placed on a horizontal plane for use. In the following, the directions indicated by the arrows X, Y, and Z are referred to as "the X direction", "the Y direction", and "the Z direction", respectively. The Z direction is the vertical direction. One direction of the X direction is referred to as "the +X direction", and the other direction is referred to as "the −X direction". The same is true of the Y and Z directions. Hence, directions toward one side are referred to as "the +Y direction" and "the +Z direction", and the directions toward the other side are referred to as "the −Y direction" and "the −Z direction". In the following description, the −Y direction is also referred to as "the front direction", and the +Y direction is also referred to as "the rear direction". The −X direction is also referred to as "the right direction", and the +X direction is also referred to as "the left direction". The −Z direction is also referred to as "the upward direction", and the +Z direction is also referred to as "the downward direction".

Figure 2:
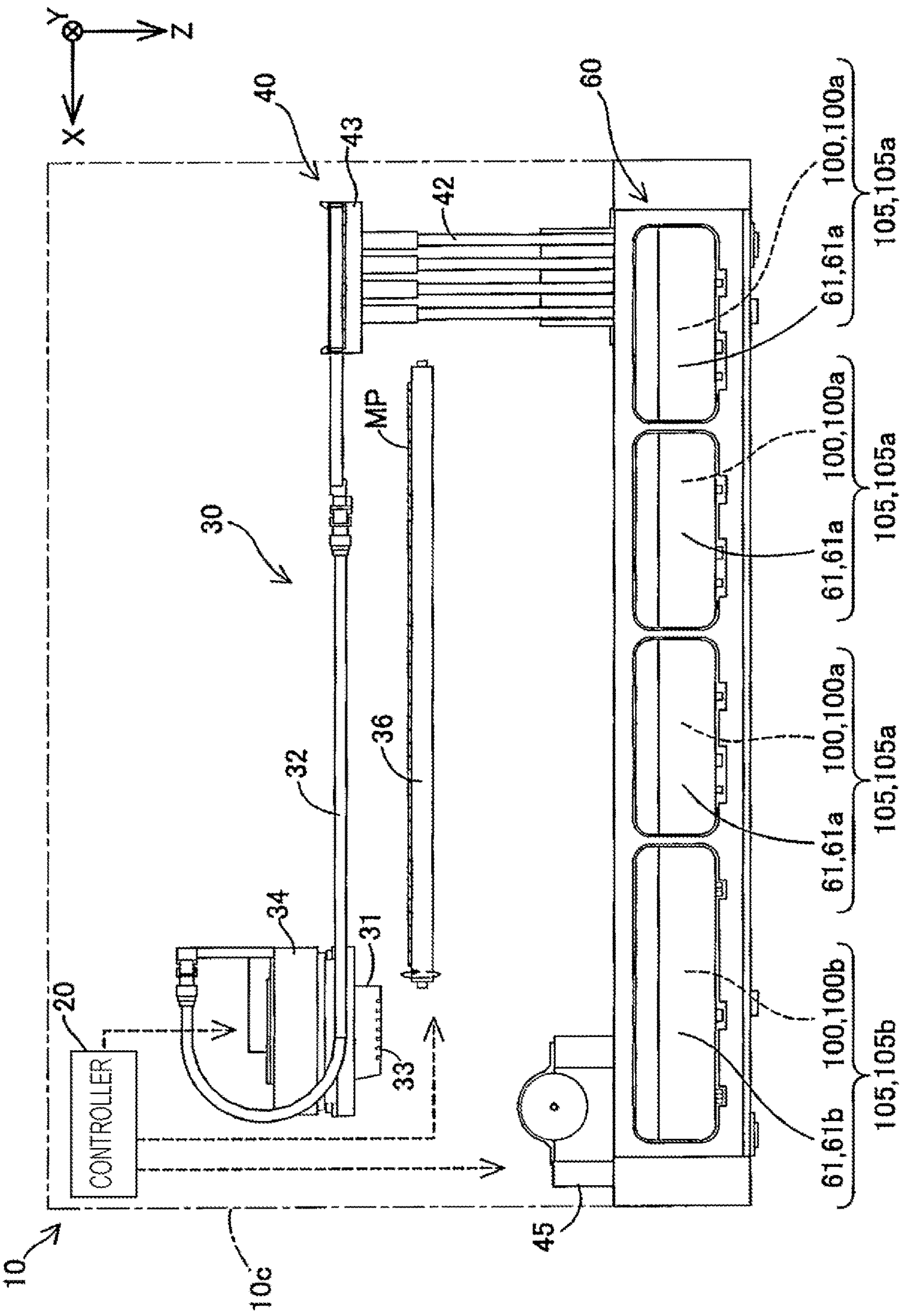
FIG. 2 is a schematic configuration diagram of the printing apparatus viewed from the front.

The printing apparatus 10 is an ink jet printer. The liquid consumed through ejection by the printing apparatus 10 is ink. The printing apparatus 10 ejects ink droplets and forms a print image on a medium MP described later, as illustrated in FIG. 2. The medium MP is, for example, a fabric or a printing sheet. The printing apparatus 10 of the present embodiment includes a housing 10*c* which is a resin hollow box serving as the casing of the printing apparatus 10. The housing 10*c* has a substantially rectangular parallelepiped shape. The front face 12 of the housing 10*c* includes an operation unit 13, a medium discharge opening 14, a medium support portion 15, and a cover member 18.

The operation unit 13 includes a display unit that displays information presented to the user and a plurality of operation buttons that receive user input operations. The medium discharge opening 14 is the exit for the medium MP discharged from the printing apparatus 10. The medium discharge opening 14 is an opening in the form of a slit having a wide width in the X direction. The medium support portion 15, located on the lower side of the medium discharge opening 14, extends in the form of a cantilever in the −Y direction and is configured to support the medium MP discharged from the medium discharge opening 14.

The cover member 18 is a resin plate-shaped member serving as part of the casing of the printing apparatus 10. The cover member 18 is detachably attached to the housing 10*c*.

The cover member 18 covers and protects attachments 105 stored in the printing apparatus 10, as illustrated in FIG. 2.

FIG. 2 is a schematic configuration diagram of the printing apparatus 10 viewed from the front. As illustrated in FIG. 2, the printing apparatus 10 includes a controller 20, an ejection performing section 30, a transportation roller 36, a liquid supply section 40, and a case storing section 60.

The case storing section 60 is located inside the cover member 18 illustrated in FIG. 1 and at a bottom portion of the printing apparatus 10. The case storing section 60 stores four attachments 105. Specifically, the four attachments 105 include three first attachments 105*a* and one second attachment 105*b*. The first attachment 105*a* and the second attachment 105*b* differ from each other in size. The second attachment 105*b* is larger than the first attachment 105*a*. Each attachment 105 includes a case 61 and a liquid storage 100 housed in the case 61. The four cases 61 of the attachments 105 include three first cases 61*a* and one second case 61*b*. The four liquid storages 100 include three first liquid storages 100*a* and one second liquid storage 100*b*. In each first attachment 105*a*, the first case 61*a* houses the first liquid storage 100*a*. In the second attachment 105*b*, the second case 61*b* houses the second liquid storage 100*b*. The second liquid storage 100*b* differs from the first liquid storage 100*a* in that the second liquid storage 100*b* has a liquid storing portion, described later, wider than that of the first liquid storage 100*a* and thus has a larger capacity than the first liquid storage 100*a*. For example, the three first liquid storages 100*a* may store cyan, magenta, and yellow inks, and the second liquid storage 100*b* may store black ink.

The ejection performing section 30 includes a liquid ejecting unit 31, a plurality of tubes 32, and a carriage 34. The bottom face of the liquid ejecting unit 31 has nozzles 33 open downward. The liquid ejecting unit 31 ejects liquid through the nozzles 33, for example, by applying pressure to the ink by using piezo elements. The liquid ejecting unit 31 is mounted on the carriage 34. The carriage 34 reciprocates linearly in the X direction. The transportation roller 36 is located below the liquid ejecting unit 31 and supported at both ends in the X direction. The transportation roller 36 transports the medium MP. The plurality of tubes 32 are aligned in the Y direction and coupled to the liquid ejecting unit 31.

The liquid supply section 40 includes four supply pipes 42, a joint portion 43, and a suction unit 45. Each of the four supply pipes 42 is coupled to the corresponding one of the four liquid storages 100. The joint portion 43 couples each one of the four supply pipes 42 to the corresponding one of the tubes 32. The liquid ejecting unit 31 is supplied with inks stored in the liquid storages 100 via the four supply pipes 42, the joint portion 43, and the plurality of tubes 32. The suction unit 45 generates pressure for sending inks from the liquid storages 100 to the supply pipes 42.

The controller 20 controls driving of each portion of the printing apparatus 10. The controller 20 includes a microcomputer including at least a central processing unit and main memory and performs various functions by causing the central processing unit to load various programs into the main memory and execute the programs.

Figure 3:
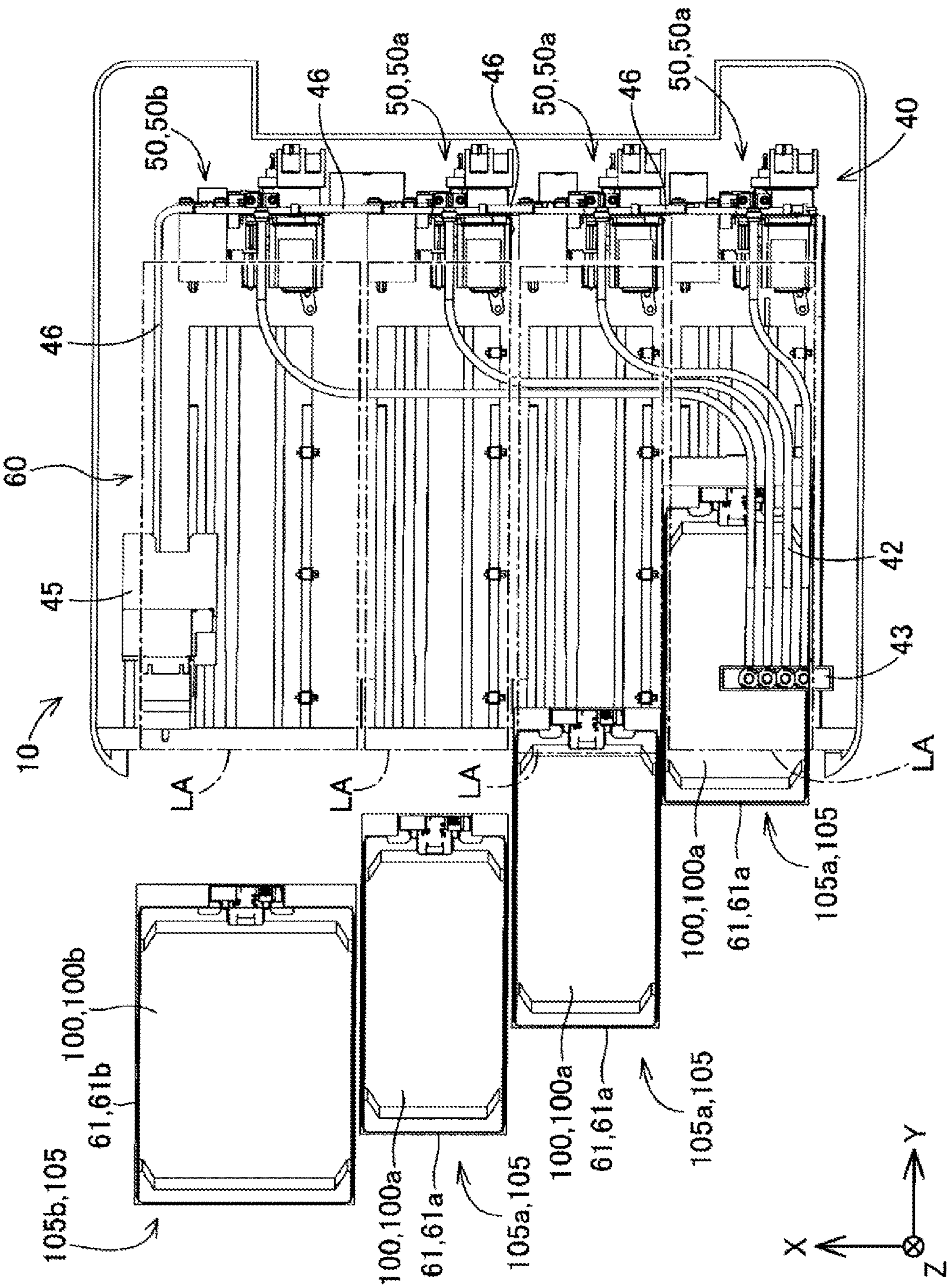
FIG. 3 is a schematic plan view of a liquid supply section from above.
Figure 4:
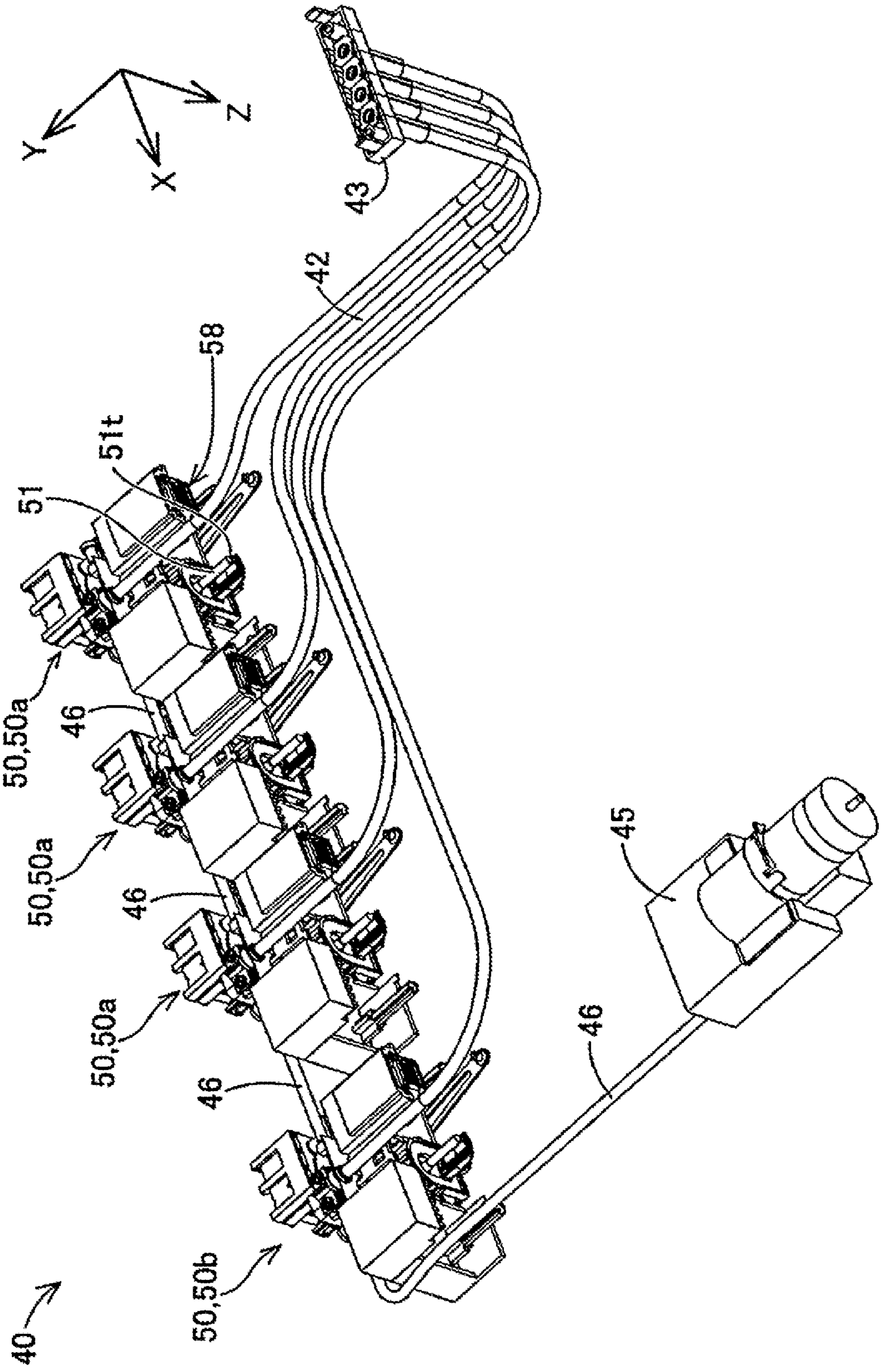
FIG. 4 is a schematic perspective view of the liquid supply section.

FIG. 3 is a schematic plan view of the liquid supply section 40 from above. FIG. 4 is a schematic perspective view of the liquid supply section 40. As illustrated in FIG. 3, the case storing section 60 receives the attachments 105 inserted in the +Y direction from the outside. The four attachments 105 housed in the case storing section 60 are aligned in the X direction. In FIG. 3, placement areas LA where the attachments 105 are placed in the case storing section 60 are indicated by dashed dotted lines.

The liquid supply section 40 includes, besides the foregoing constituents, four switching mechanisms 50 and a pressure transfer pipe 46. The four switching mechanisms 50 are located on the +Y direction side of the placement areas LA. The four switching mechanisms 50 are located so as to be associated with the four respective placement areas LA. The four switching mechanisms 50 include, specifically, three first switching mechanisms 50*a* and one second switching mechanism 50*b*. The three first switching mechanisms 50*a* are associated with the three respective first liquid storages 100*a*. The second switching mechanism 50*b* is associated with the second liquid storage 100*b*.

As illustrated in FIG. 4, each switching mechanism 50 includes a liquid introduction portion 51 and an apparatus-side terminal 58. The liquid introduction portion 51 is detachably coupled to a liquid storage 100. The liquid introduction portion 51 has a tubular shape extending straight in the −Y direction. The liquid introduction portion 51 is coupled to the liquid storage 100 by the distal end portion 51*t* of the liquid introduction portion 51 being inserted into a liquid supply portion, described later, of the liquid storage 100. Thus, the liquid stored in the liquid storage 100 flows through the liquid introduction portion 51. The pressure transfer pipe 46 transfers the pressure generated by the suction unit 45.

The apparatus-side terminal 58 is formed of an elastic plate-shaped member. The apparatus-side terminal 58 is electrically coupled to the controller 20 illustrated in FIG. 2 via wiring or the like.

A2. Configuration of Liquid Storage

Figure 5:
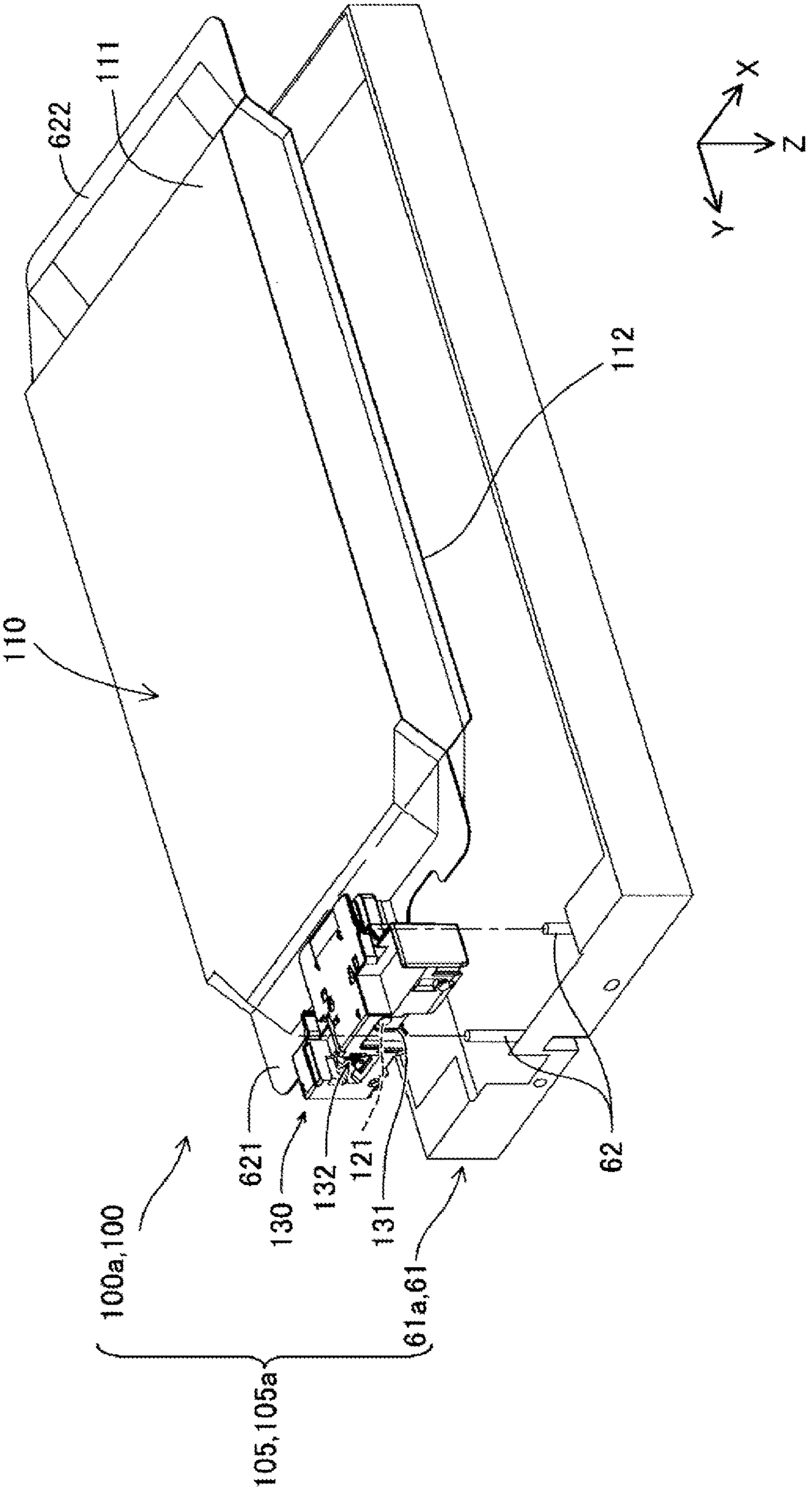
FIG. 5 is a schematic exploded perspective view of a first liquid storage removed from a first case.
Figure 6:
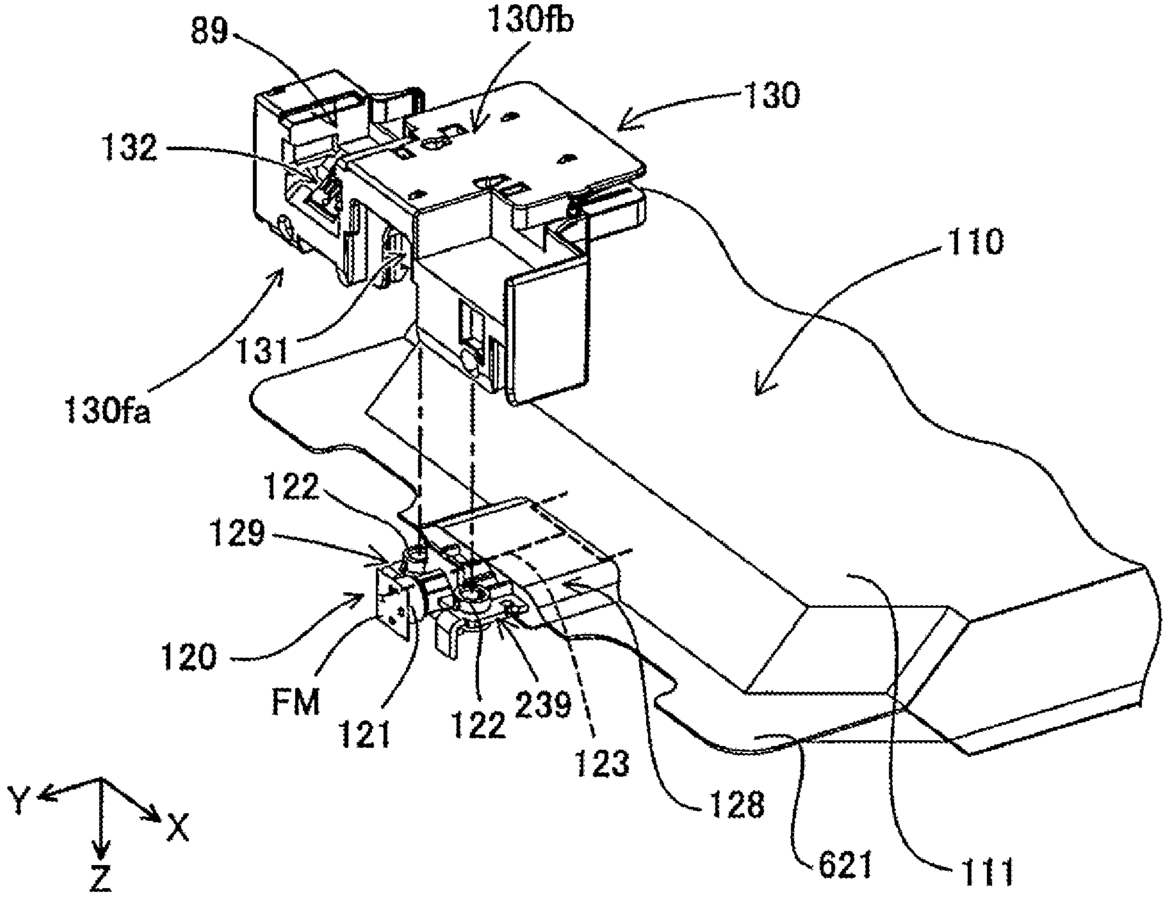
FIG. 6 is a schematic exploded perspective view of an adapter removed from a liquid supply member.

FIG. 5 is a schematic exploded perspective view of a first liquid storage 100*a* removed from a first case 61*a*. FIG. 6 is a schematic exploded perspective view of an adapter 130 removed from a liquid supply member 120. The second attachment 105*b* has a configuration the same as or similar to that of the first attachment 105*a*. Accordingly, the first attachment 105*a* will be representatively described in the following, and description of the second attachment 105*b* will be omitted.

The case 61 is an open top container in the form of a tray. The case 61 is made of, for example, a resin material such as polypropylene. A liquid storage 100 is detachably placed into the case 61 from above. At end portions of the case 61 in the +Y direction, two columnar guide portions 62 are provided so as to stand upward from the lower face of the case 61. The two guide portions 62 guide the adapter 130 described later when the liquid storage 100 is placed in the case 61.

The liquid storage 100 includes a liquid storing portion 110 and the adapter 130 illustrated in FIG. 5 and also includes the liquid supply member 120 coupled to the liquid storing portion 110, as illustrated in FIG. 6. The liquid storing portion 110 illustrated in FIG. 5 is a bag for storing liquid. The liquid storing portion 110 is flexible. The liquid storing portion 110 is formed of a plurality of films attached together. The liquid storing portion 110 and the liquid supply member 120 are joined together by putting together the plurality of films composing the liquid storing portion 110, joining portions of the peripheral edges of the films together by a method such as heat welding, and joining together other portions of the peripheral edges and the liquid supply member 120. The liquid storing portion 110 in the present embodiment is a so-called gusset bag including a film of a first face 111 described later, a film of a second face 112 described later, and two films located at either end portion in the X direction and serving as gussets. Note that the liquid storing portion 110 is not limited to a gusset type and may be a bag of a so-called pillow type composed of two films. The films included in the liquid storing portion 110 are made of a flexible material having gas barrier properties. Examples of materials for the films include polyethylene terephthalate (PET), nylon, and polyethylene. Alternatively, a film having a stacked structure in which a plurality of films of any of the above materials are stacked may be used. In such a stacked structure, for example, the outer layer may be formed of PET or nylon, both of which have excellent impact resistance, and the inner layer may be formed of polyethylene, which has excellent ink resistance. In addition, the stacked structure may include a film having a vapor deposition layer of aluminum or the like as one constituent.

The liquid storing portion 110 includes a first face 111 forming the upper face and a second face 112 forming the bottom face. The first face 111 and the second face 112 are opposed in the Z direction. The first face 111 and the second face 112 are main faces which are the largest of the faces included in the liquid storing portion 110. The liquid storing portion 110 has one end portion 621 and another end portion 622 opposed to the one end portion 621. The one end portion 621 is an end portion in the +Y direction. The other end portion 622 is an end portion in the −Y direction. As the liquid in the liquid storing portion 110 is consumed, the liquid storing portion 110 deforms such that the first face 111 and the second face 112 come closer to each other, and the volume of the liquid storing portion 110 decreases.

Here, in the liquid storage 100, the Z direction in which the first face 111 and the second face 112 are opposed corresponds to the thickness direction, the Y direction in which the end portion 621 and the other end portion 622 are opposed corresponds to the length direction, and the X direction orthogonal to the thickness direction and the length direction corresponds to the width direction. In the present embodiment, in a state in which the liquid storage 100 is attached to the printing apparatus 10 in normal use, the thickness direction corresponds to the up-down direction.

As illustrated in FIG. 6, the liquid supply member 120 is attached to the one end portion 621 of the liquid storing portion 110. The liquid supply member 120 includes a supply path 123 communicating with the inside of the liquid storing portion 110, a coupling portion 128, and an engaged member 129.

The supply path 123 is a flow path for supplying the liquid stored in the liquid storing portion 110 to the printing apparatus 10. In the liquid supply direction from the liquid storing portion 110 toward the printing apparatus 10, the upstream end of the supply path 123 is located inside the liquid storing portion 110, and the downstream end of the supply path 123 is located outside the liquid storing portion 110.

The coupling portion 128 is coupled to the one end portion 621 of the liquid storing portion 110 by heat welding. The coupling portion 128 includes an upstream portion of the supply path 123.

The engaged member 129 is coupled to an end portion in the +Y direction of the coupling portion 128. The engaged member 129 includes a tubular liquid supply portion 121 and an engagement forming portion 239 located on both sides of the liquid supply portion 121 in the width direction of the liquid storage 100. The liquid supply portion 121 includes a downstream portion of the supply path 123 and is configured to be coupled to the liquid introduction portion 51 illustrated in FIG. 4. The distal-end opening of the liquid supply portion 121 is sealed by a film FM in the initial state before being attached to the printing apparatus 10.

The engagement forming portion 239 is a substantially plate-shaped member. The engagement forming portion 239 has two positioning holes 122 extending in the Z direction, which is the thickness direction. The two positioning holes 122 enable the adapter 130 to be positioned relative to the liquid supply member 120 when the adapter 130 is engaged with and attached to the liquid supply member 120. The two positioning holes 122 are located on either side of the liquid supply portion 121 in the width direction of the liquid storing portion 110. The engagement forming portion 239 is configured to engage the adapter 130. The engagement with the adapter 130 will be described in detail later.

The adapter 130 illustrated in FIG. 6 includes an adapter first side **130*fa* having a recess 131 configured to receive the liquid supply portion 121 of the liquid supply member 120 and an adapter second side 130*fb* located on the side opposite to the adapter first side 130*fa*. The recess 131** is open in the +Y direction and the +Z direction.

The adapter 130 engages the liquid supply member 120 by being moved relative to and toward the liquid supply member 120 with the adapter first side **130*fa* facing the liquid supply member 120. The adapter 130 has a circuit substrate 132. The circuit substrate 132 is located in a recess 89 formed at a corner portion of the adapter 130 at which the adapter second side 130*fb* intersects the front face. The front surface of the circuit substrate 132 has a storage terminal configured to be in contact with the apparatus-side terminal 58 illustrated in FIG. 4 in a state in which the liquid storage 100 is attached to the printing apparatus 10. The back surface of the circuit substrate 132 has memory for storing various kinds of information on the liquid storage 100. The memory is electrically coupled to the storage terminal by wiring. The various kinds of information stored in the memory include, for example, information on the type of the liquid storage 100, the liquid capacity, and an identification number. In the attached state, the memory and the controller 20 of the printing apparatus 10** can exchange various kinds of information.

A3. Detailed Configuration of Adapter and Liquid Supply Member

Figure 7:
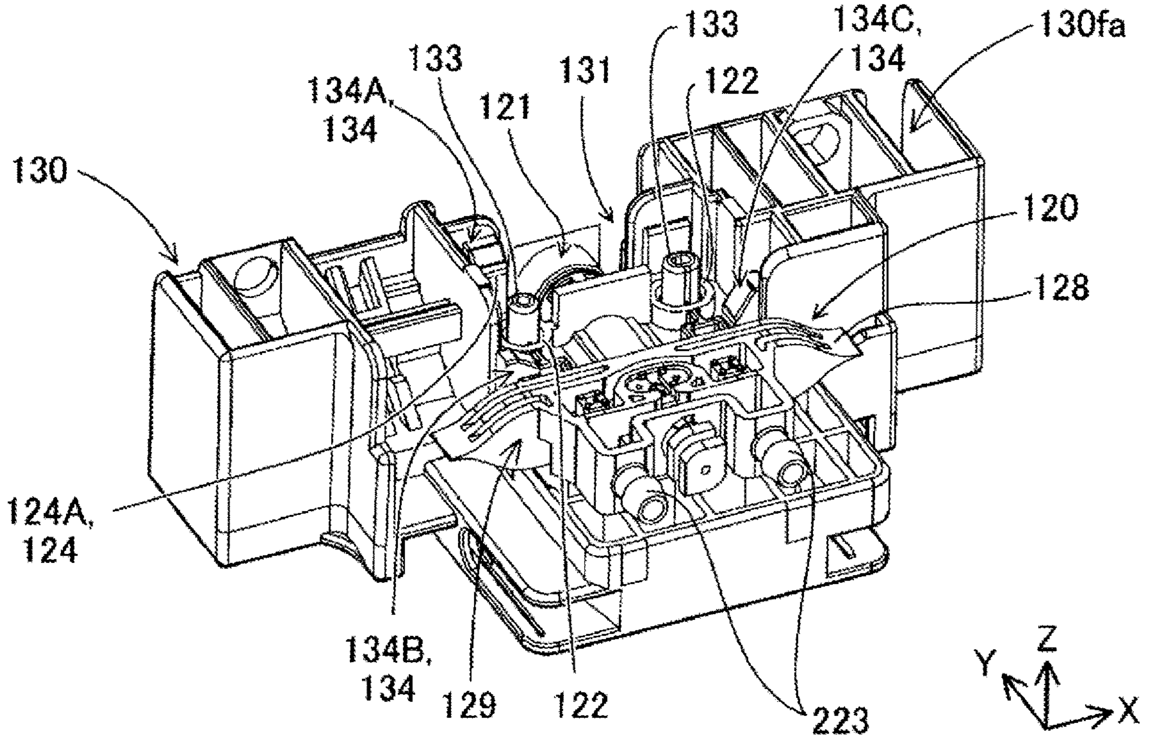
FIG. 7 a perspective view of the adapter and the liquid supply member engaged with each other.
Figure 8:
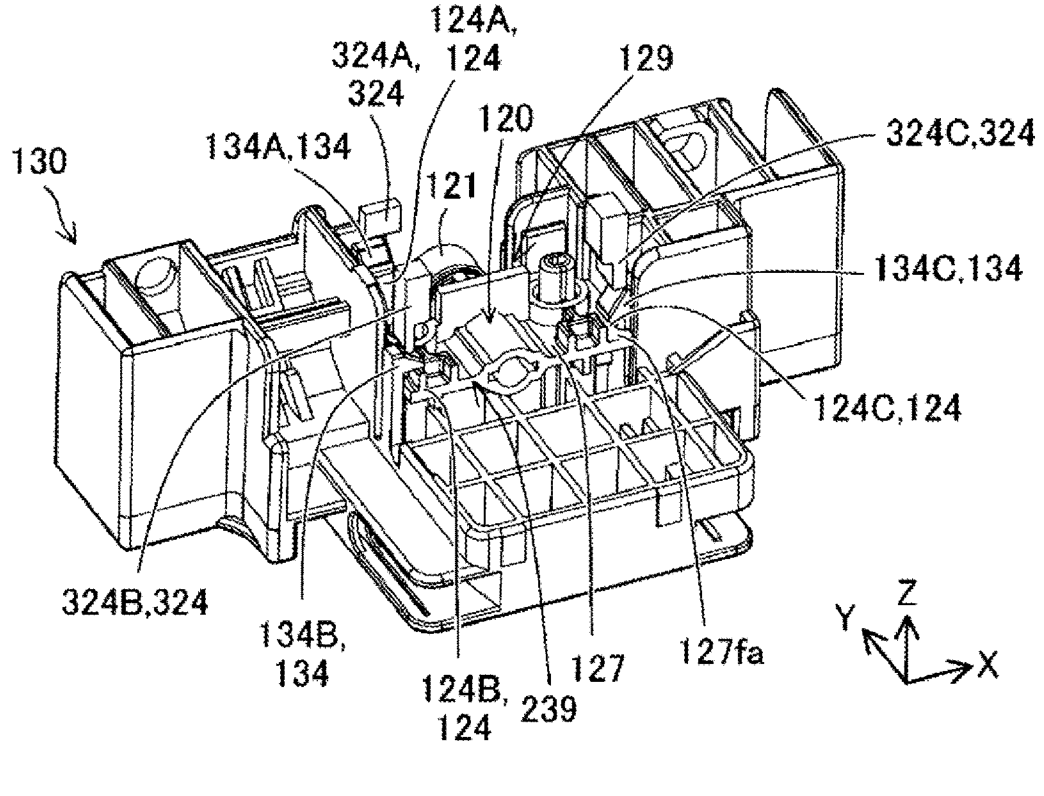
FIG. 8 is the same view as in FIG. 7 but with a coupling portion of the liquid supply member removed.

FIG. 7 is a perspective view of the adapter 130 and the liquid supply member 120 engaged with each other. FIG. 8 is the same view as in FIG. 7 but with the coupling portion 128 of the liquid supply member 120 removed. FIG. 8 also illustrates a first protrusion 324A to a third protrusion 324C of a disengagement tool. The first protrusion 324A is used to disengage a first engaging portion 134A described later, the second protrusion 324B is used to disengage a second engaging portion 134B described later, and the third protrusion 324C is used to disengage a third engaging portion 134C described later. The first protrusion 324A to the third protrusion 324C are referred to as the protrusions 324 when referred to without being distinguished from each other.

As illustrated in FIG. 7, the coupling portion 128 has two leading portions 223. The leading portions 223 are located inside the liquid storing portion 110. The leading portions 223 are upstream end portions of the supply path 123. The liquid that flows into the leading portions 223 from the liquid storing portion 110 is supplied through the liquid supply portion 121 to the printing apparatus 10.

As illustrated in FIG. 7, the adapter first side **130*fa* of the adapter 130 has two positioning protrusions 133 extending in the Z direction, which is the attachment direction in which the adapter 130 is attached to the liquid supply member 120. The two positioning protrusions 133 are inserted into the two respective positioning holes 122. This configuration restricts the movement of the adapter 130 relative to the liquid supply member 120 in the directions intersecting the attachment direction, and accordingly, the adapter 130** is positioned in the directions intersecting the attachment direction.

As illustrated in FIG. 8, the adapter 130 further includes a plurality of engaging portions 134A, 134B, and 134C configured to face the engagement forming portion 239 of the liquid supply member 120 in the Z direction and engage the engagement forming portion 239. The plurality of engaging portions 134A, 134B, and 134C are the first engaging portion 134A, the second engaging portion 134B, and the third engaging portion 134C. The plurality of engaging portions 134A to 134C are simply referred to as the engaging portions 134 when referred to without being distinguished from each other. The engaging portions 134 are snap-fit portions capable of engaging and disengaging through elastic deformation. The first engaging portion 134A faces the engaged member 129 in the Z direction at an end portion in the +Y direction of the engaged member 129 and engages the engaged member 129. The second engaging portion 134B and the third engaging portion 134C face the engaged member 129 in the Z direction at either end portion of the engaged member 129 in the X direction, which is the width direction, and engage the engaged member 129. Detailed configuration of the engaging portions 134 will be described later.

As illustrated in FIG. 8, the engagement forming portion 239 of the liquid supply member 120 has a plurality of engaged portions 124A, 124B, and 124C. The plurality of engaged portions 124A, 124B, and 124C are referred to as a first engaged portion 124A, a second engaged portion 124B, and a third engaged portion 124C. The plurality of engaged portions 124A to 124C are simply referred to as the engaged portions 124 when referred to without being distinguished from each other.

The first engaged portion 124A is engaged by the first engaging portion 134A. The second engaged portion 124B is engaged by the second engaging portion 134B. The third engaged portion 124C is engaged by the third engaging portion 134C. The first engaged portion 124A is an extension portion extending in the +Z direction from a +Y direction end portion of an engaging-portion main body 127. The first engaging portion 134A hooks and engages the distal end face in the +Z direction of the first engaged portion 124A, which is an extension portion. The second engaged portion 124B includes a protrusion protruding from a +Z direction-side face 127*fa* of the engaging-portion main body 127 and the engaging-portion main body 127 to which the protrusion is coupled. The protrusion included in the second engaged portion 124B protrudes from a −X direction peripheral-edge portion of the face 127*fa*. The second engaging portion 134B hooks and engages the +Z direction distal end face of the protrusion of the second engaged portion 124B. The third engaged portion 124C is part of the plate-shaped engaging-portion main body 127 of the engagement forming portion 239. Specifically, the third engaged portion 124C is a +X direction peripheral-edge portion of the engaging-portion main body 127. The third engaging portion 134C hooks and engages the face 127*fa*, which is the +Z direction side of the engaging-portion main body 127.

In the Z direction in which the engaging portions 134 engage the engaged member 129, the first engaged portion 124A is the longest, and the third engaged portion 124C is the shortest.

Figure 9:
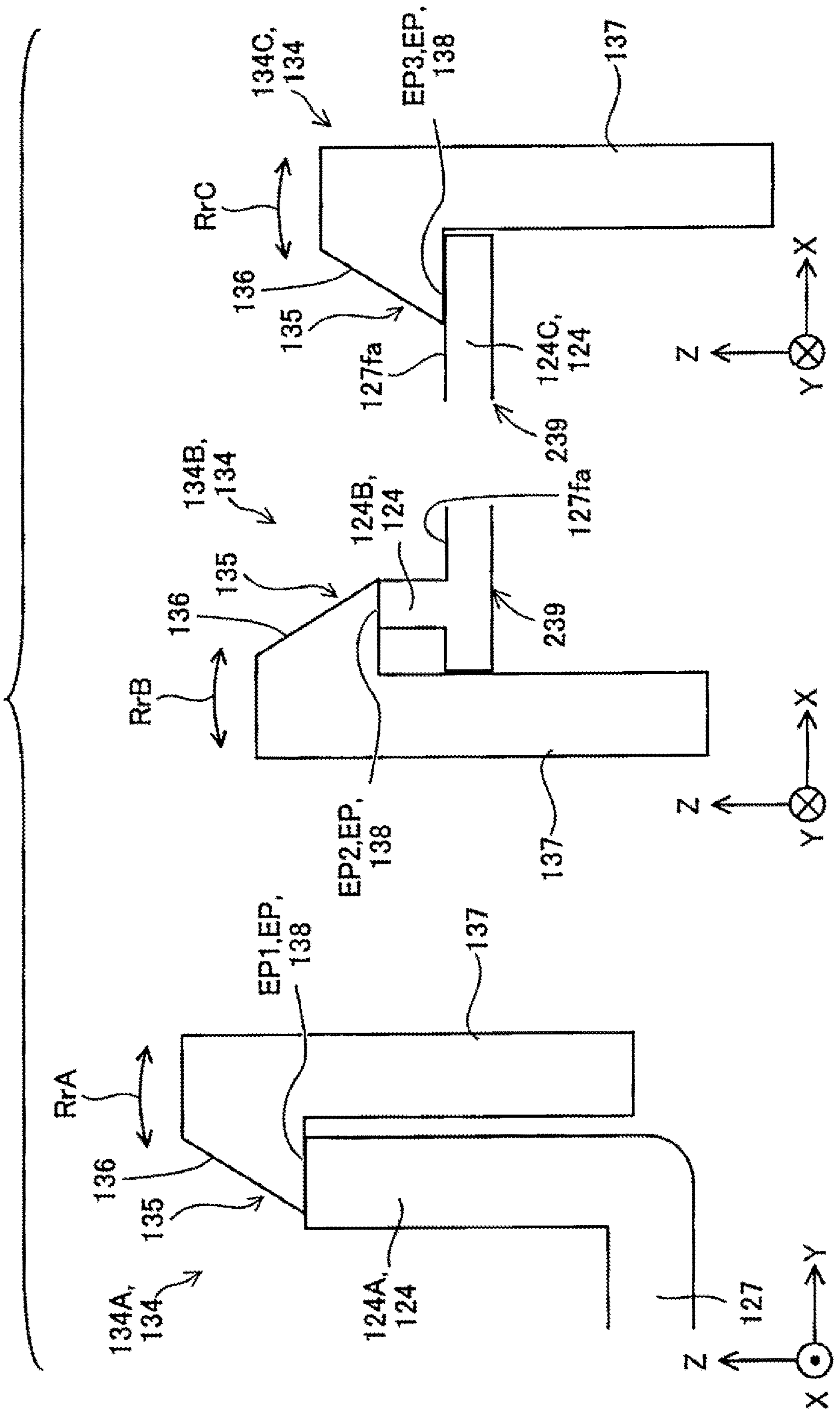
FIG. 9 is a diagram for explaining details of engaging portions and engaged portions.

FIG. 9 is a diagram for explaining details of the engaging portions 134 and the engaged portions 124. Each engaging portion 134 has a main body 137 extending in the Z direction, which is the thickness direction of the liquid storage 100, and a hook portion 135 coupled to a +Z direction end portion of the main body 137. The main body 137 deforms elastically in the directions of the arrows RrA to RrC with the proximal end portion, which is the end portion in the −Z direction and is coupled to the adapter main body of the adapter 130, as the support point, so that the hook portion 135 is displaced. The hook portion 135 is a claw-like portion protruding from the main body 137 in a direction intersecting the thickness direction.

Each hook portion 135 has an engagement face 138 configured to face and engage the engaged portion 124A, 124B, or 124C of the engagement forming portion 239 in the Z direction. In other words, each of the engaging portions 134A to 134B engages the corresponding one of the engaged portions 124A to 124C of the engagement forming portion 239 of the liquid supply member 120 with the engagement face 138 facing the engaged portion. The engagement faces 138 restrict the movement in the +Z direction of the liquid supply member 120 by being in contact with the engaged portions 124 of the liquid supply member 120. The direction normal to the engagement face 138 is the −Z direction and is the engagement direction in which each of the first engaging portion 134A to the third engaging portion 134C engages the corresponding one of the first engaged portion 124A to the third engaged portion 124C. In other words, the direction from each of the engaging portions 134A to 134C toward the corresponding one of the first engaged portion 124A to the third engaged portion 124C of the liquid supply member 120 is the engagement direction. In the present embodiment, the engagement direction is the downward direction of the up-down direction in the state in which the liquid storage 100 is attached to the printing apparatus 10. The engagement direction in which each of the first engaging portion 134A to the third engaging portion 134C engages the engaged member 129 of the liquid supply member 120 is the same direction, which is the −Z direction in the present embodiment. Since the engagement directions of the plurality of engaging portions 134A to 134C are the same, it is easy to engage and disengage the engaging portions 134 with and from the liquid supply member 120. Note that the engagement face 138 does not have to be a planar surface as in the present embodiment and may be, for example, a curved surface. In this case, the direction normal to the plane tangent to the engagement face 138 at the point that comes into contact with the engaged portion 124 of the liquid supply member 120 is regarded as the direction normal to the engagement face 138.

The hook portion 135 also has an inclined surface 136 inclined relative to the −Z direction, which is the engagement direction. The inclined surface 136 is inclined relative to the engagement direction such that the position on the inclined surface 136, in the −Z direction, which is the engagement direction, is in the protruding direction of the hook portion 135.

The hooking direction in which the engaging portion 134 hooks the engaged portion 124 is a direction intersecting the engagement direction, which is the −Z direction, and also the protruding direction in which the engagement face 138 protrudes from the main body 137. Specifically, the hooking direction of the first engaging portion 134A is the −Y direction. The hooking direction of the second engaging portion 134B is the +X direction. The hooking direction of the third engaging portion 134C is the −X direction. As described above, the hooking directions in which the first engaging portion 134A to the third engaging portion 134C, which are snap-fit portions, hook the engaged portions 124A to 124C of the liquid supply member 120 differ from one another. Since the hooking directions differ from one another, even if an external force acts on the engaging portions 134 due to a shock caused by dropping or the like, it is less likely that all of the engaging portions 134A to 134C unintentionally disengage from the liquid supply member 120.

The position at which the first engaging portion 134A engages the first engaged portion 124A is referred to as the first engagement position EP1. The position at which the second engaging portion 134B engages the second engaged portion 124B is referred to as the second engagement position EP2. The position at which the third engaging portion 134C engages the third engaged portion 124C is referred to as the third engagement position EP3. The first engagement position EP1 to the third engagement position EP3 are referred to as the engagement positions EP when referred to without being distinguished from each other. In the −Z direction, which is the engagement direction, the first engagement position EP1 to the third engagement position EP3 of the first engaging portion 134A to the third engaging portion 134C, which are snap-fit portions, differ from one another. Specifically, the first engagement position EP1 is at the +Z direction end of all of the engagement positions, and the third engagement position EP3 is at the −Z direction end of all of the engagement positions. Since the first engagement position EP1 to the third engagement position EP3 differ from one another in the −Z direction, which is the engagement direction, even if a force acts on one engaging portion 134 unintentionally, it is possible to prevent the force from acting on the other engaging portions 134. This configuration makes it less likely that the plurality of engaging portions 134A to 134C unintentionally disengage from the liquid supply member 120.

A4. Method of Reusing Adapter

The adapter 130 illustrated in FIG. 6 is reusable by disengaging and removing the adapter 130 from the liquid supply member 120. The following describes a method of reusing the adapter 130.

The disengagement tool has the first protrusion 324A to the third protrusion 324C having different protruding heights so that the first engaging portion 134A to the third engaging portion 134C, which are snap-fit portions, are disengaged from the respective first to third engaged portions 124A to 124C at the same timing. Specifically, the protruding height of the first protrusion 324A is lowest, and the protruding height of the third protrusion is highest. Regarding the heights in the +Z direction of the hook portions 135 of the first engaging portion 134A to the third engaging portion 134C with respect to a specified reference surface, as illustrated in FIG. 9, the first engaging portion 134A is highest, and the third engaging portion 134C is lowest. Accordingly, the heights of the first protrusion 324A to the third protrusion 324C are determined so as to have a relationship opposite to the above height relationship. With this configuration, in a disengagement process, each of the first protrusion 324A to the third protrusion 324C come into contact with the corresponding one of the hook portions 135 of the first engaging portion 134A to the third engaging portion 134C to release the engagements at the same timing.

Figure 10:
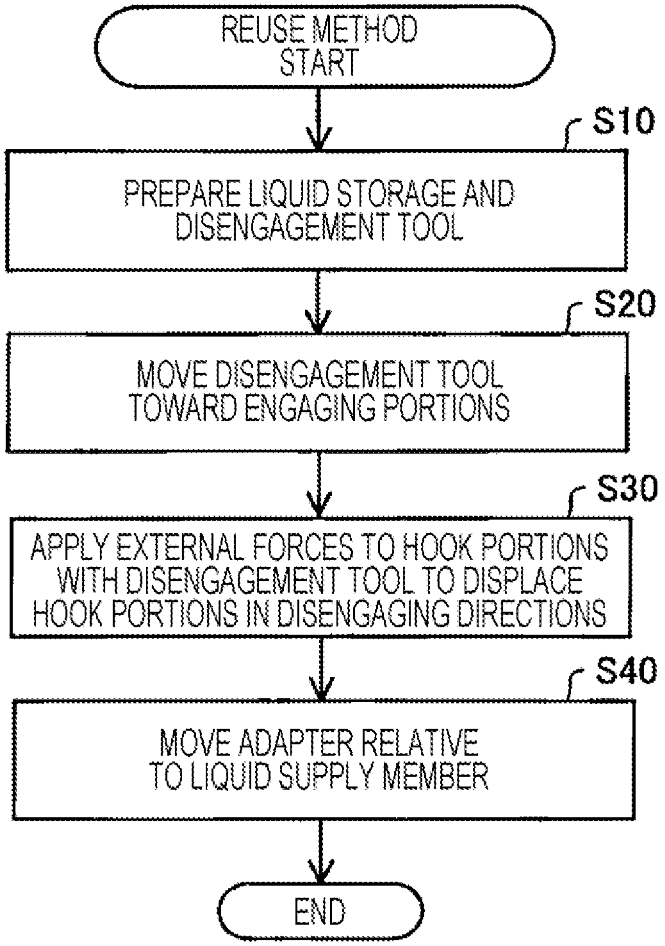
FIG. 10 is a flowchart illustrating a method of reusing the adapter.
Figure 11:
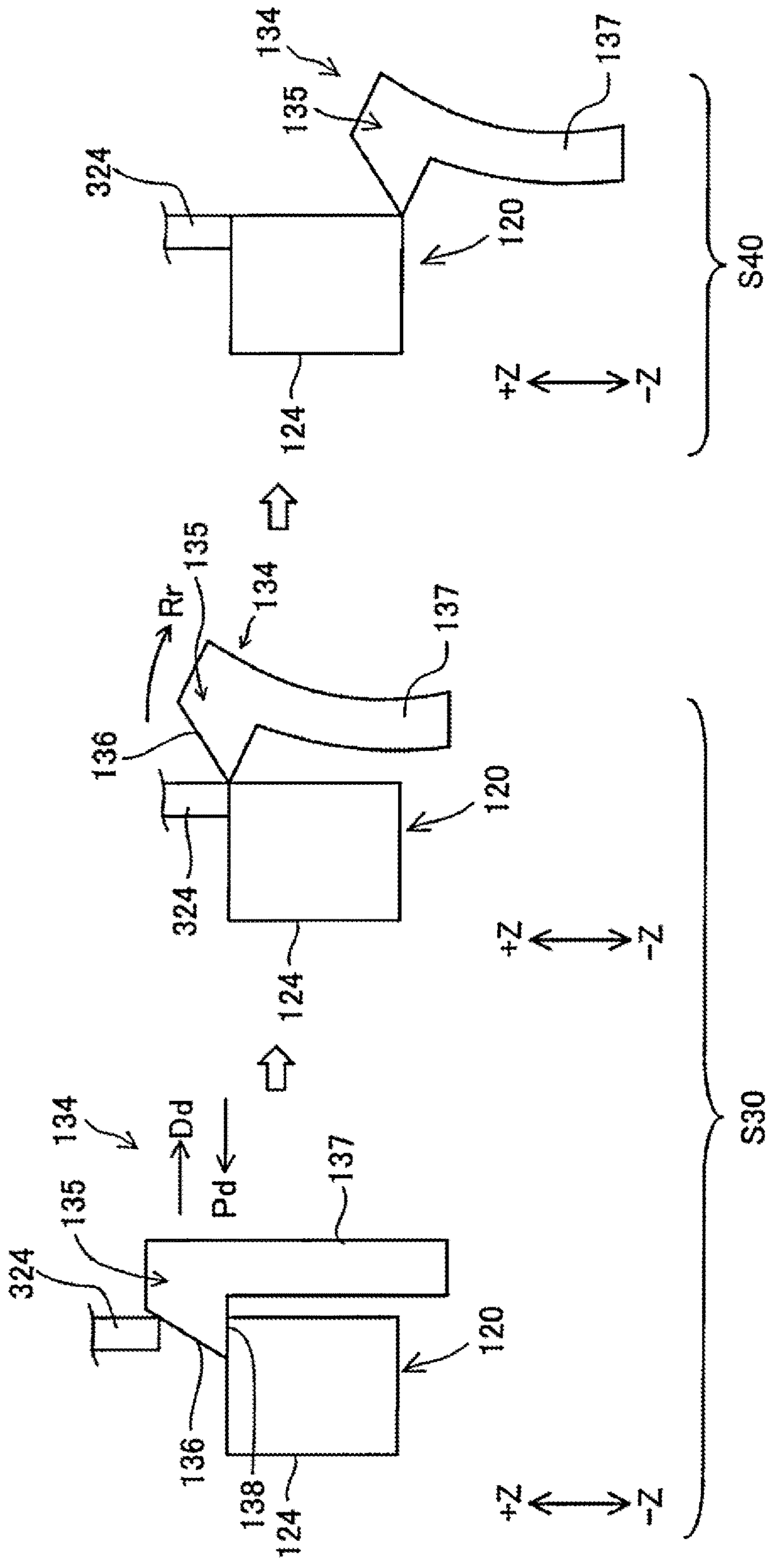
FIG. 11 is a diagram for explaining the process in which an engaging portion is detached and removed from the liquid supply member.

FIG. 10 is a flowchart illustrating a method of reusing the adapter 130. FIG. 11 is a diagram for explaining the process in which an engaging portion 134 of the adapter 130 is detached and removed from the liquid supply member 120.

As illustrated in FIG. 10, in the method of reusing the adapter 130, first, the liquid storage 100 and a disengagement tool (not illustrated) are prepared in step S10. Next, in step S20, the protrusions 324 of the disengagement tool are moved relative to and toward the respective engaging portions 134 of the adapter 130. For example, the protrusions 324 of the disengagement tool are moved in the −Z direction, which is the engagement direction, with the adapter first side 130*fa* illustrated in FIG. 6 facing the −Z direction.

As illustrated in FIG. 10, in step S30, the protrusions 324 of the disengagement tool are used to apply external forces to the hook portions 135 to displace the hook portions 135 in the disengaging directions. As illustrated in the left diagram in FIG. 11, in step S30, each protrusion 324 is pushed toward the inclined surface 136 of the corresponding hook portion 135 in the −Z direction, which is the engagement direction, and comes into contact with the inclined surface 136. From this state, the protrusion 324 is further pushed in the −Z direction, which is the engagement direction, to displace the hook portion 135 in the disengaging direction Dd. The disengaging direction Dd is the direction opposite to the protruding direction Pd of the hook portion 135, specifically, the engagement face 138. The hook portion 135 is displaced in the disengaging direction Dd such that the main body 137 elastically deforms in the arrow Rr direction with the proximal end of the main body 137 as the support point as illustrated in the central diagram in FIG. 11. Note that the arrow Rr direction collectively expresses the arrows RrA to RrC illustrated in FIG. 9. The central diagram in FIG. 11 illustrates a time point at which the hook portion 135 has just been disengaged from the engaged portion 124 and the engagement has been released. The hook portions 135 of the first engaging portion 134A to the third engaging portion 134C are disengaged from the first engaged portion 124A to the third engaged portion 124C at the same time.

As illustrated in FIG. 10, after the hook portions 135 of the engaging portions 134 are disengaged from the engaged portions 124, the adapter 130 is moved relative to the liquid supply member 120 in step S40 to be removed from the liquid supply member 120. Specifically, as illustrated in the right diagram in FIG. 11, the adapter 130 is moved in the −Z direction, which is the engagement direction, relative to the liquid supply member 120 in the state in which the hook portions 135 are disengaged from the engaged portions 124. It can be said that the −Z direction is also the removal direction of the adapter 130. With this operation, the plurality of engaging portions 134A to 134C, which are a plurality of snap-fit portions, move along the sides of the respective engaged portions 124 and then detach from the engaged portions 124A to 124C of the liquid supply member 120. Here, the timings at which the plurality of engaging portions 134A to 134C detach from the engaged portions 124A to 124C of the liquid supply member differ from one another. Specifically, of the engaged portions 124A to 124C, the longer the portion of an engaged portion 124 extending in the −Z direction, which is the removal direction, the later the engaging portion 134 detaches from the engaged portion 124 of the liquid supply member 120. In the present embodiment, the timing at which the third engaging portion 134C detaches from the third engaged portion 124C is earliest, and the timing at which the first engaging portion 134A detaches from the first engaged portion 124A is latest.

The adapter 130 removed from the liquid supply member 120 is reused. For example, to reuse the adapter 130, the adapter 130 is attached by engagement to a newly produced liquid supply member 120 or a liquid supply member 120 attached to a liquid storing portion 110 refilled with liquid.

In the above embodiment, since the plurality of engaging portions 134A to 134C are engaged with the liquid supply member 120 in the liquid storage 100 as illustrated in FIG. 8, it is less likely that the adapter 130 disengages from the liquid supply member 120. In the above embodiment, it is easy to displace the hook portions 135 in the disengaging directions Dd and remove the adapter 130 from the liquid supply member 120 by applying external forces to the hook portions 135 with a disengagement tool, as illustrated in FIG. 11. In contrast, it is not easy to apply external forces to the hook portions 135 of the plurality of engaging portions 134 without a disengagement tool to displace the hook portions 135 in the disengaging directions Dd. Hence, it is less likely that the adapter 130 is unintentionally removed from the liquid supply member 120. In addition, since the timings at which the plurality of hook portions 135 detach from the engaged portions 124 of the liquid supply member 120 differ in the above embodiment, when one of the hook portions 135 has detached from the engaged portion 124, the remaining hook portions 135 have not detached from the engaged portions 124. Hence, while this configuration makes it easy to disengage the adapter 130 from the engaged portions 124 of the liquid supply member 120 by using a disengagement tool, the configuration makes it further less likely that the adapter 130 is unintentionally removed from the liquid supply member 120 without using the disengagement tool.

B. Other Embodiments

B1: Another Embodiment 1

Although the engagement directions of the first engaging portion 134A to the third engaging portion 134C are all the −Z direction in the above embodiment, at least two engagement directions may differ. Although the first engagement position EP1 to the third engagement position EP3 of the plurality of engaging portions 134A to 134C differ from one another in the Z direction, which is the engagement direction, in the above embodiment, at least two engagement positions EP may be the same. In addition, a configuration in which the engagement directions of the first engaging portion 134A to the third engaging portion 134C are directions other than the −Z direction is not out of the spirit of the present disclosure. Although the hooking directions in which the plurality of engaging portions 134A to 134C hook the engagement forming portion 239 of the liquid supply member 120 differ from one another in the above embodiment as illustrated in FIG. 9, at least two hooking directions may be the same. In addition, although the timings at which the first engaging portion 134A to the third engaging portion 134C detach from the first engaged portion 124A to the third engaged portion 124C of the liquid supply member 120 differ from one another in the above embodiment, the timings at which at least two of the first engaging portion 134A to the third engaging portion 134C detach may be the same.

C. Other Aspects

The present disclosure is not limited to the foregoing embodiments and can be implemented in various aspects within a scope not departing from the spirit of the present disclosure. For example, the present disclosure may be implemented in the following aspects. The technical features in the foregoing embodiments corresponding to the technical features of the aspects presented below can be replaced or combined as appropriate to solve some or all of the issues in the present disclosure or to achieve some of all of the effects of the present disclosure. In addition, unless technical features are described in the present specification as essential ones, they can be omitted as appropriate.

(1) A first aspect of the present disclosure provides a liquid storage configured to be detachably attached to a printing apparatus. The liquid storage includes: a liquid supply member coupled to the liquid storing portion and having a supply path for supplying the liquid stored in the liquid storing portion to the printing apparatus; and an adapter having a plurality of engaging portions configured to engage the liquid supply member. In this configuration, since the adapter engages the liquid supply member with the plurality of engaging portions, it is less likely that the adapter disengages from the liquid supply member.

(2) In the above aspect, each of the engaging portions may have an engagement face to restrict movement of the liquid supply member, each of the engaging portions may engage the liquid supply member with the engagement face facing the liquid supply member, an engagement direction in which each of the engaging portions engages the liquid supply member, the engagement direction being from the engagement face of each of the engaging portions toward the liquid supply member, may be a direction normal to each engagement face, and the engagement direction of each of the engaging portions may be the same. In this configuration, since the engagement direction of each of the engaging portions is the same, it is easy to engage and disengage the engaging portions with and from the liquid supply member.

(3) In the above aspect, each of the engaging portions may be a snap-fit portion, and an engagement position of each of the snap-fit portions in the engagement direction may differ from the engagement positions of other snap-fit portions. In this configuration, since the positions of the hook portions in the engagement direction differ from one another, it is less likely that the plurality of engaging portions unintentionally disengage from the liquid supply member.

(4) In the above aspect, a hooking direction in which each of the snap-fit portions hooks the liquid supply member may be a direction intersecting the engagement direction and may differ from the hooking directions of the other snap-fit portions. In this configuration, since the hooking directions intersect the engagement direction and differ from one another, it is less likely that the plurality of engaging portions unintentionally disengage from the liquid supply member.

(5) A second aspect of the present disclosure provides a method of reusing an adapter configured to engage a liquid supply member of a liquid storage. The reuse method may apply an external force to the plurality of engaging portions of the liquid storage of the above aspect by using a tool having protrusions adapted to the plurality of snap-fit portions to elastically deform and displace the snap-fit portions so as to release engagements of the snap-fit portions. This configuration makes it possible to remove the adapter from the liquid supply member by applying an external force to the hook portions with a tool and easily displacing the snap-fit portions in the disengaging directions, and this configuration also reduces the possibility that the adapter is unintentionally removed from the liquid supply member without using a tool.

(6) In the above aspect, timings at which the engagements of the plurality of snap-fit portions are released may be the same, and timings at which the plurality of snap-fit portions detach from the liquid supply member may differ from one another. In this configuration, since the plurality of snap-fit portions detach from the liquid supply member at different timings, it is further less likely that the adapter is unintentionally removed from the liquid supply member without using a tool, while it is easy to disengage the adapter from the liquid supply member with the tool.

The present disclosure can be implemented in various aspects other than the above ones. For example, the present disclosure can be implemented as a method of manufacturing a liquid storage, a method of removing an adapter from a liquid supply member, and the like.

What is claimed is:

1. A liquid storage configured to be detachably attached to a printing apparatus, comprising:

a liquid storing portion for storing liquid;

a liquid supply member coupled to the liquid storing portion and having a supply path for supplying the liquid stored in the liquid storing portion to the printing apparatus; and an adapter having a plurality of engaging portions configured to engage the liquid supply member, wherein each of the engaging portions has an engagement face to restrict movement of the liquid supply member, each of the engaging portions engages the liquid supply member with the engagement face facing the liquid supply member, an engagement direction in which each of the engaging portions engages the liquid supply member, the engagement direction being from the engagement face of each of the engaging portions toward the liquid supply member, is a direction normal to each engagement face, the engagement direction of each of the engaging portions is the same, each of the engaging portions is a snap-fit portion, an engagement position of each of the snap-fit portions in the engagement direction differs from the engagement positions of other snap-fit portions, each engaging portion includes a first portion that is a straight portion extending along the engagement direction and a second portion at an end of the first portion, the second portion having the engagement face, and when the engaging portions are snap-fitted on the liquid supply member, the engagement faces of the engaging portions are perpendicular to the engagement direction along which the first portions of the engaging portions extend.

2. The liquid storage according to claim 1, wherein a hooking direction in which each of the snap-fit portions hooks the liquid supply member is a direction intersecting the engagement direction and differs from the hooking directions of the other snap-fit portions.

3. A method of reusing an adapter configured to engage a liquid supply member of a liquid storage, the adapter having a plurality of engaging portions configured to engage the liquid supply member, the liquid supply member being coupled to a liquid storing portion and having a supply path for supplying liquid stored in the liquid storing portion to a printing apparatus, each of the engaging portions having an engagement face to restrict movement of the liquid supply member, each of the engaging portions engaging the liquid supply member with the engagement face facing the liquid supply member, an engagement direction in which each of the engaging portions engages the liquid supply member being a direction normal to each engagement face, the engagement direction being from the engagement face of each of the engaging portions toward the liquid supply member, the engagement direction of each of the engaging portions being the same, each of the engaging portions being a snap-fit portion, an engagement position of each of the snap-fit portions in the engagement direction differing from the engagement positions of other snap-fit portions, the method comprising:

applying an external force to the plurality of snap-fit portions by using a tool with protrusions adapted to the plurality of snap-fit portions to elastically deform and displace the snap-fit portions so as to release engagements of the snap-fit portions, wherein each of the engaging portions has an engagement face to restrict movement of the liquid supply member, each of the engaging portions engages the liquid supply member with the engagement face facing the liquid supply member, an engagement direction in which each of the engaging portions engages the liquid supply member, the engagement direction being from the engagement face of each of the engaging portions toward the liquid supply member, is a direction normal to each engagement face, the engagement direction of each of the engaging portions is the same, each of the engaging portions is a snap-fit portion, an engagement position of each of the snap-fit portions in the engagement direction differs from the engagement positions of other snap-fit portions, each engaging portion includes a first portion that is a straight portion extending along the engagement direction and a second portion at an end of the first portion, the second portion having the engagement face, and when the engaging portions are snap-fitted on the liquid supply member, the engagement faces of the engaging portions are perpendicular to the engagement direction along which the first portions of the engaging portions extend.

4. The method of reusing an adapter, according to claim 3, wherein timings at which the engagements of the plurality of snap-fit portions are released are the same, and timings at which the plurality of snap-fit portions detach from the liquid supply member differ from one another.

* * * * *